R. L. NELSON.
COFFEE-POT.

No. 192,593. Patented July 3, 1877.

Witnesses:

Inventor:
Rich'd L. Nelson
Per C. H. Watson & Co. Attorneys.

UNITED STATES PATENT OFFICE.

RICHARD L. NELSON, OF ORANGE COURT-HOUSE, VIRGINIA.

IMPROVEMENT IN COFFEE-POTS.

Specification forming part of Letters Patent No. 192,593, dated July 3, 1877; application filed June 1, 1877.

*To all whom it may concern:*

Be it known that I, RICHARD L. NELSON, of Orange Court-House, in the county of Orange and State of Virginia, have invented certain new and useful Improvements in Coffee and Tea Pots; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of an attachment for coffee-pots, as will be hereinafter more fully set forth.

Figure 1:
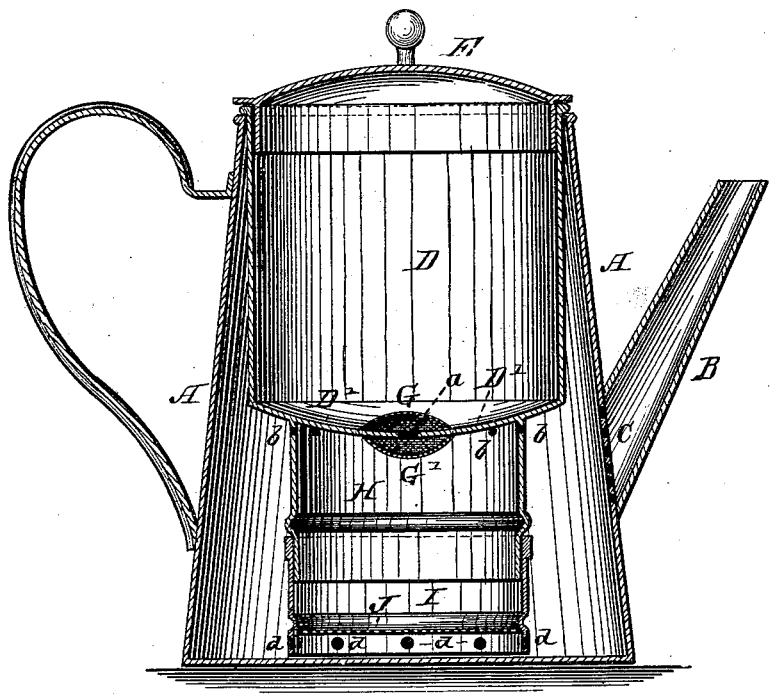
Figure 2:
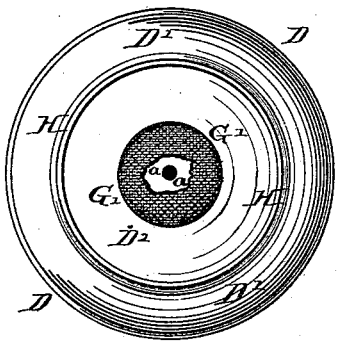

In the annexed drawing, which fully illustrates my invention, Figure 1 is a vertical section of a coffee-pot with my invention placed therein. Fig. 2 is a bottom view of the attachment.

A represents a coffee-pot of any ordinary construction, and provided with a spout, B. At the base of this spout, in the body of the coffee-pot, is formed the usual strainer C. D represents a reservoir, of suitable dimensions, fitting through the top of the coffee-pot, and supported thereon by a bead around its upper end. This reservoir is closed at the top by a lid, E, and extends about half-way down into the coffee-pot, more or less. It is provided with a concave bottom, D', in the center of which is an orifice, a. Over this orifice is sesured a convex strainer, G, of wire-cloth or other suitable material, which will prevent any substances that may be in the water from passing down with the water into the coffee. On the under side of the bottom D' is a similar strainer, G', covering the orifice a on that side, for preventing the coffee, when rising, from clogging said orifice.

To the under side of the bottom D' is attached a cylinder, H, extending downward for a suitable distance, and provided with a series of perforations, b, at and around its upper end. The lower end of this cylinder is inserted in a cup, I, which rests on the bottom of the coffee-pot.

The bottom J of the cup I is made of perforated sheet metal, or other suitable material, and is elevated above the lower edge of the cup sufficiently far to allow of a series of perforations, d, being made in said cup below the perforated bottom.

The ground coffee is placed in the cup I, after which the reservoir D is placed in the coffee-pot, the cylinder H entering the top of the cup I. The hot water is then poured into the reservoir D, and the lid E put on. The hot water then percolates through the orifice a and strainers G G' down to and through the coffee in the cup I, rising therein and passing out into the coffee-pot proper, both at the bottom and through the top perforations b.

The strainer G' prevents the coffee from clogging up the orifice a, through which the water passes from the reservoir.

This attachment for coffee-pots is very simple in construction, yet durable, and answers the purpose fully for which it is intended. It can be easily removed from the coffee-pot, and the parts separated, as far as necessary, for cleaning.

Having thus fully described my invention, what I claim as new, and desire to secure by Letters Patent, is—

1. In an attachment for coffee-pots, a water-reservoir, D, provided with a coffee-receptacle underneath, and the bottom of said reservoir having an orifice, a, with strainers G G', one above and one below the same, substantially as and for the purposes herein set forth.

2. The combination of the water-reservoir D, with concave bottom D', having orifice a and strainers G G', the cylinder H, with top perforations b, and the cup I, with bottom perforations d, and the elevated perforated bottom J, all substantially as and for the purposes herein set forth.

In testimony that I claim the foregoing as my own I have hereto affixed my signature in presence of two witnesses.

RICHARD L. NELSON.

Witnesses:
 WM. B. UPPERMAN,
 C. H. WATSON.